United States Patent
Wada et al.

(10) Patent No.: US 9,036,068 B2
(45) Date of Patent: May 19, 2015

(54) CMOS IMAGE SENSOR WITH FAST READ OUT

(75) Inventors: Takamasa Wada, Kanagawa (JP);
Takayuki Toyama, Kanagawa (JP);
Tomonori Mori, Kanagawa (JP)

(73) Assignee: SONY CORPORATION (JP)

( * ) Notice: Subject to any disclaimer, the term of this patent is extended or adjusted under 35 U.S.C. 154(b) by 602 days.

(21) Appl. No.: 12/578,636

(22) Filed: Oct. 14, 2009

(65) Prior Publication Data
US 2010/0097510 A1 Apr. 22, 2010

(30) Foreign Application Priority Data
Oct. 16, 2008 (JP) ................................. 2008-267471

(51) Int. Cl.
*H04N 3/14* (2006.01)
*H04N 5/335* (2011.01)
*H04N 5/374* (2011.01)

(52) U.S. Cl.
CPC ................................. *H04N 5/3742* (2013.01)

(58) Field of Classification Search
None
See application file for complete search history.

(56) References Cited

U.S. PATENT DOCUMENTS

| | | | |
|---|---|---|---|
| 5,896,172 A * | 4/1999 | Korthout et al. | 348/248 |
| 6,337,713 B1 * | 1/2002 | Sato | 348/311 |
| 2002/0071046 A1 * | 6/2002 | Harada | 348/316 |
| 2002/0179820 A1 * | 12/2002 | Stark | 250/208.1 |
| 2003/0043089 A1 * | 3/2003 | Hanson et al. | 345/55 |
| 2004/0135910 A1 * | 7/2004 | Nam | 348/308 |
| 2005/0007475 A1 * | 1/2005 | Hori et al. | 348/321 |
| 2005/0012836 A1 * | 1/2005 | Guidash | 348/302 |
| 2005/0237406 A1 * | 10/2005 | Kim et al. | 348/308 |
| 2007/0076109 A1 * | 4/2007 | Krymski | 348/300 |
| 2008/0258042 A1 * | 10/2008 | Krymski | 250/208.1 |

FOREIGN PATENT DOCUMENTS

| | | |
|---|---|---|
| JP | S62-281574 | 12/1987 |
| JP | H06-78218 | 3/1994 |
| JP | H06-217206 | 8/1994 |
| JP | 2002-135795 | 5/2002 |
| JP | 2006-270292 | 10/2006 |
| JP | 2008-103992 | 5/2008 |

OTHER PUBLICATIONS

Official Action for Japan Patent Application No. 2008-267471, dated Oct. 16, 2012, 4 pages.

* cited by examiner

*Primary Examiner* — Justin P Misleh
(74) *Attorney, Agent, or Firm* — Sheridan Ross P.C.

(57) ABSTRACT

An image pickup element includes a plurality of read signal lines; a pixel unit in which a plurality of pixel circuits are arranged in a matrix form, the plurality of pixel circuits in the pixel unit being divided into groups of pixel circuits so that each of the groups is provided in a corresponding one of columns, each of the groups of pixel circuits being connected to a corresponding one of the plurality of read signal lines; and a processing unit configured to process read signals that the plurality of pixel circuits, which are divided into groups, output to the plurality of read signal lines, which are connected to the plurality of pixel circuits.

18 Claims, 14 Drawing Sheets

FIG. 8
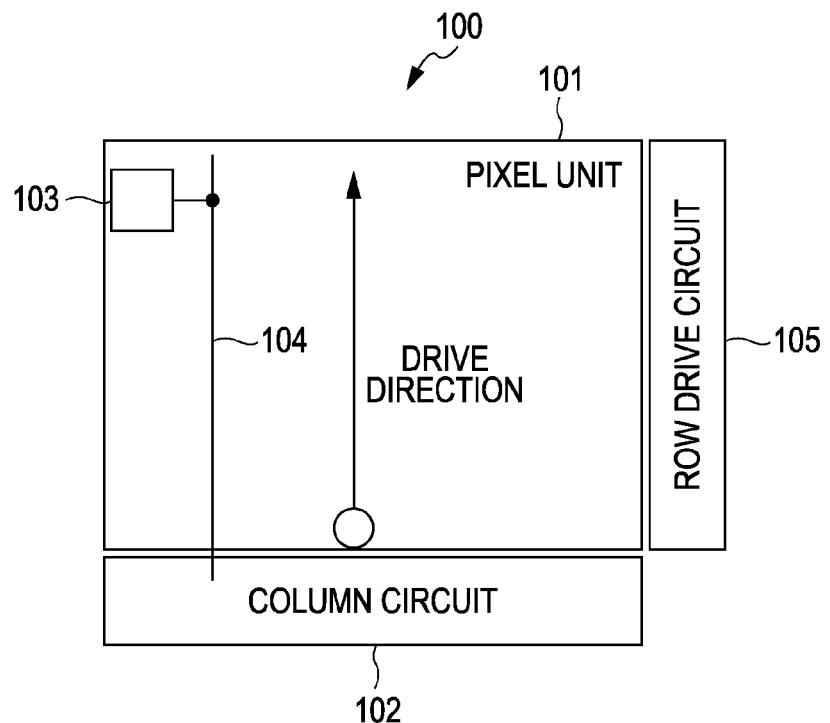
FIG. 9A     FIG. 9B     FIG. 9C
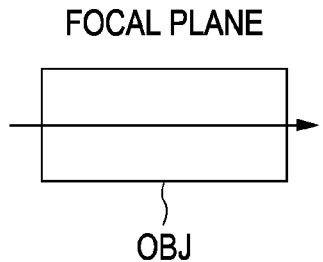 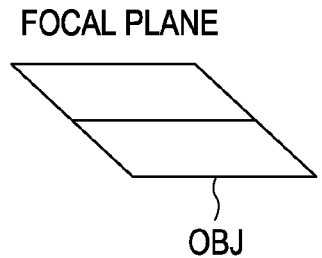 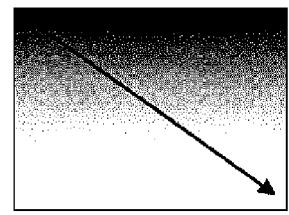

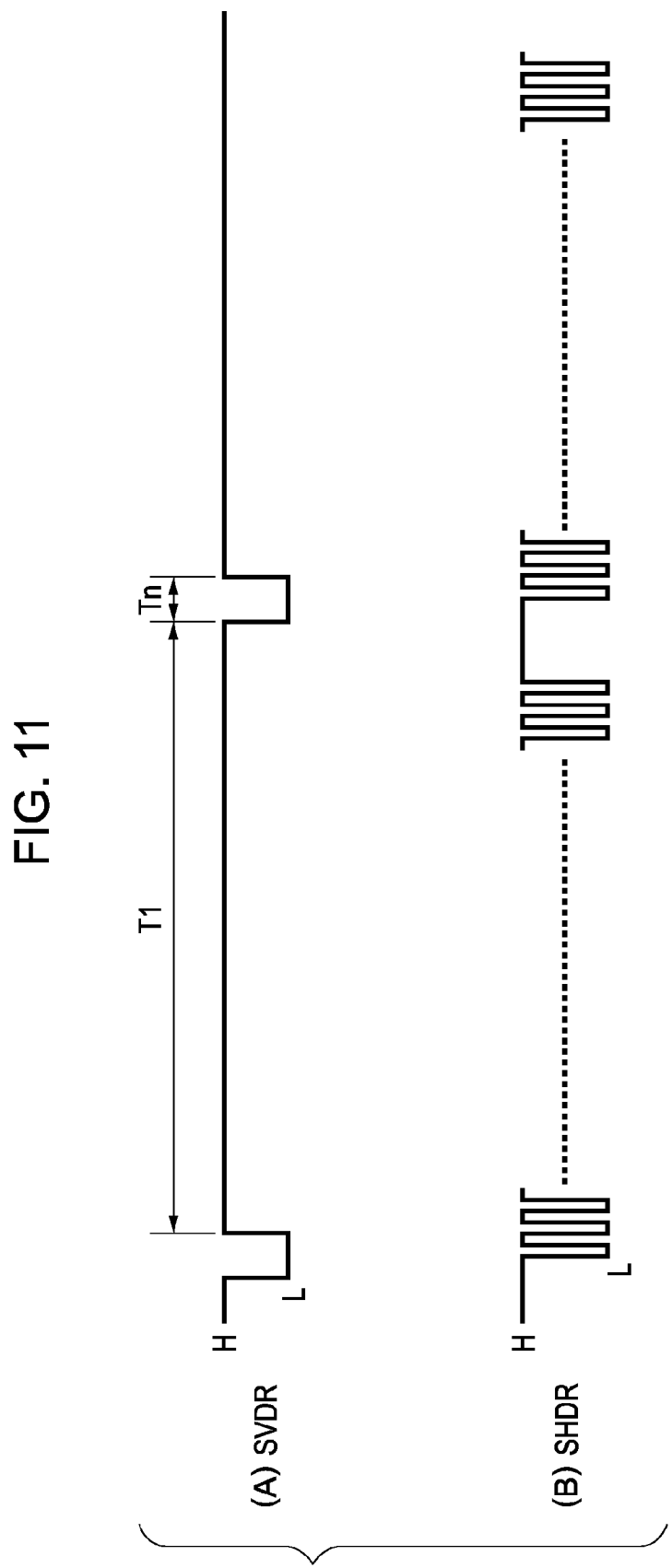

000# CMOS IMAGE SENSOR WITH FAST READ OUT

CROSS REFERENCE TO RELATED APPLICATIONS

This application contains subject matter related to and claims the benefit of priority from the prior Japanese Patent Application JP 2008-267471, filed in the Japanese Patent Office on 16 Oct. 2008, the disclosure of which is incorporated herein by reference in its entirety to the extent permitted by law.

BACKGROUND OF THE INVENTION

1. Field of the Invention

The present invention relates to an image pickup element such as a complementary metal oxide semiconductor (CMOS) image sensor and a method for controlling the image pickup element, and a camera.

2. Description of the Related Art

In recent years, in CMOS image sensors, the number of pixels has been increased, and the light-receiving area has been increased. In a typical X-Y address CMOS image sensor, a plurality of pixel circuits are arranged in a matrix form in a pixel unit. The pixel circuits are divided into groups so that each of the groups is provided in a corresponding one of columns, and the individual pixel circuits in each of the groups are connected to a corresponding one of vertical signal lines.

A parasitic resistance and a parasitic capacitance exist in each of the vertical signal lines. Accordingly, when the values of the parasitic resistance and the parasitic capacitance are large, the pixel readout time is increased. As a result, shifts between the pixel readout times for the individual columns or shifts between the charge accumulation times occur, and a focal plane phenomenon easily occurs. The focal plane phenomenon is a phenomenon in which distortion occurs in a picked-up image, and it is difficult to correct the distortion in a picked-up image using affine transformation or the like.

In order to reduce the phenomenon, a design in which the parasitic resistances are reduced by increasing the width of the vertical signal lines, and a design in which the parasitic capacitances are reduced by increasing the wiring pitch of the vertical signal lines have been performed. A design can also be performed, in which the parasitic resistances and the parasitic capacitances of the vertical signal lines can be reduced by chaining the pitch of the pixel circuits. However, the design has a disadvantage that the characteristics of pixels are sacrificed.

For this reason, a CMOS image sensors are is proposed, in which the parasitic resistances and the parasitic capacitances of vertical signal lines are reduced by dividing a pixel region into two regions, and by electrically disconnecting the vertical signal lines from one another in the pixel region.

The CMOS image sensor may be referred to as a "sense-amplifier-type CMOS image sensor". Charge that is accumulated in pixel circuits is output as voltage signals to the vertical signal lines without being amplified, and sense amplifiers read changes in levels of the voltage signals that are transmitted to the vertical signal lines.

SUMMARY OF THE INVENTION

In some aspects, in a CMOS image sensor, only KTC noise can be reduced by reducing the parasitic resistances of the vertical signal lines and so forth. Accordingly, it is difficult to reduce the focal plane phenomenon that is caused by shifts between the pixel readout times for individual columns or shifts between the charge accumulation times.

Further, in some CMOS image sensors, increasing of the speed at which reading out of pixels is performed is not considered.

It is desirable to provide an image pickup element and a method for controlling the image pickup element, and a camera, which can reduce the focal plane phenomenon, and which can increase the speed at which reading out of pixels is performed.

According to an embodiment of the present invention, there is provided an image pickup element including a plurality of read signal lines; a pixel unit in which a plurality of pixel circuits are arranged in a matrix form, the plurality of pixel circuits in the pixel unit being divided into groups of pixel circuits so that each of the groups is provided in a corresponding one of columns, each of the groups of pixel circuits being connected to a corresponding one of the plurality of read signal lines; and a processing unit configured to process read signals that the plurality of pixel circuits, which are divided into groups, output to the plurality of read signal lines, which are connected to the plurality of pixel circuits.

It is preferable that the pixel unit be divided into a first pixel region and a second pixel region. It is preferable that the plurality of pixel circuits be divided into two as a plurality of pixel circuits in the first pixel region and a plurality of pixel circuits in the second pixel region, and the plurality of pixel circuits in the first pixel region and the plurality of pixel circuits in the second pixel region be divided into groups so that each of the groups is provided in a corresponding one of the columns.

It is preferable that the image pickup element according to the embodiment of the present invention further include a selection drive unit configured to select and drive each of the plurality of pixel circuits. It is preferable that the selection drive unit sequentially drive the plurality of pixel circuits in the first pixel region in units of rows in a direction from a last row of the first pixel region to a first row of the first pixel region, and sequentially drive the plurality of pixel circuits in the second pixel region in units of rows in a direction from a last row of the second pixel region to a first row of the second pixel region.

It is preferable that the image pickup element according to the embodiment of the present invention further include a selection drive unit configured to select and drive each of the plurality of pixel circuits. It is preferable that the selection drive unit sequentially drive the plurality of pixel circuits in the first pixel region in units of rows in a direction from a first row of the first pixel region to a last row of the first pixel region, and sequentially drive the plurality of pixel circuits in the second pixel region in units of rows in a direction from a last row of the second pixel region to a first row of the second pixel region.

It is preferable that the image pickup element according to the embodiment of the present invention further include a selection drive unit configured to select and drive each of the plurality of pixel circuits. It is preferable that the selection drive unit sequentially drive the plurality of pixel circuits in the first pixel region in units of rows in a direction from a last row of the first pixel region to a first row of the first pixel region, and sequentially drive the plurality of pixel circuits in the second pixel region in units of rows in a direction from a first row of the second pixel region to a last row of the second pixel region.

It is preferable that the plurality of pixel circuits be divided into groups of pixel circuits which are connected to the plurality of read signal lines so that each of the groups is provided in a corresponding one of the columns.

According to an embodiment of the present invention, there is provided a method for controlling an image pickup element, the method including the steps of: outputting, by a plurality of pixel circuits that are divided into groups, read signals to read signal lines that are connected to the plurality of pixel circuits, the plurality of pixel circuits being arranged in a matrix form in a pixel unit and being divided into groups of pixel circuits so that each of the groups is provided in a corresponding one of columns, each of the groups of pixel circuits being connected to a corresponding one of the read signal lines; and processing the read signals that the plurality of pixel circuits output to the read signal lines.

According to an embodiment of the present invention, there is provided a camera including an image pickup element; an optical system configured to lead incident light onto a pixel region of the image pickup element; and a signal processing section configured to perform signal processing on read signals that the image pickup element outputs. The image pickup element includes a plurality of read signal lines; a pixel unit in which a plurality of pixel circuits are arranged in a matrix form, the plurality of pixel circuits in the pixel unit being divided into groups of pixel circuits so that each of the groups is provided in a corresponding one of columns, each of the groups of pixel circuits being connected to a corresponding one of the plurality of read signal lines; and a processing unit configured to process read signals that the plurality of pixel circuits, which are divided into groups, output to the plurality of read signal lines, which are connected to the plurality of pixel circuits.

According to any one of the embodiments of the present invention, the plurality of pixel circuits are arranged in a matrix form. The plurality of pixel circuits are divided into groups so that each of the groups is provided in a corresponding one of columns, and the pixel circuits in each of the groups output read signals to a corresponding one of the read signal lines.

Then, the processing unit processes the read signals that the plurality of pixel circuits, which are divided into groups, output to the plurality of read signal lines, which are connected to the plurality of pixel circuits.

According to the embodiments of the present invention, the focal plane phenomenon can be reduced, and the speed at which reading out of pixels is performed can be increased.

BRIEF DESCRIPTION OF THE DRAWINGS

FIG. 8 is a schematic block diagram of a main portion of a typical CMOS image sensor to show the CMOS image sensor as an example;

FIGS. 9A to 9C are schematic illustrations showing examples of picked-up images that are obtained by the CMOS image sensor shown in FIG. 8;

FIG. 11 is a timing diagram illustrating an example of an operation of the typical CMOS image sensor shown in FIG. 8;

DESCRIPTION OF THE PREFERRED EMBODIMENTS

Hereinafter, embodiments of the present invention will be described with reference to the accompanying drawings.

First Embodiment

Figure 1:
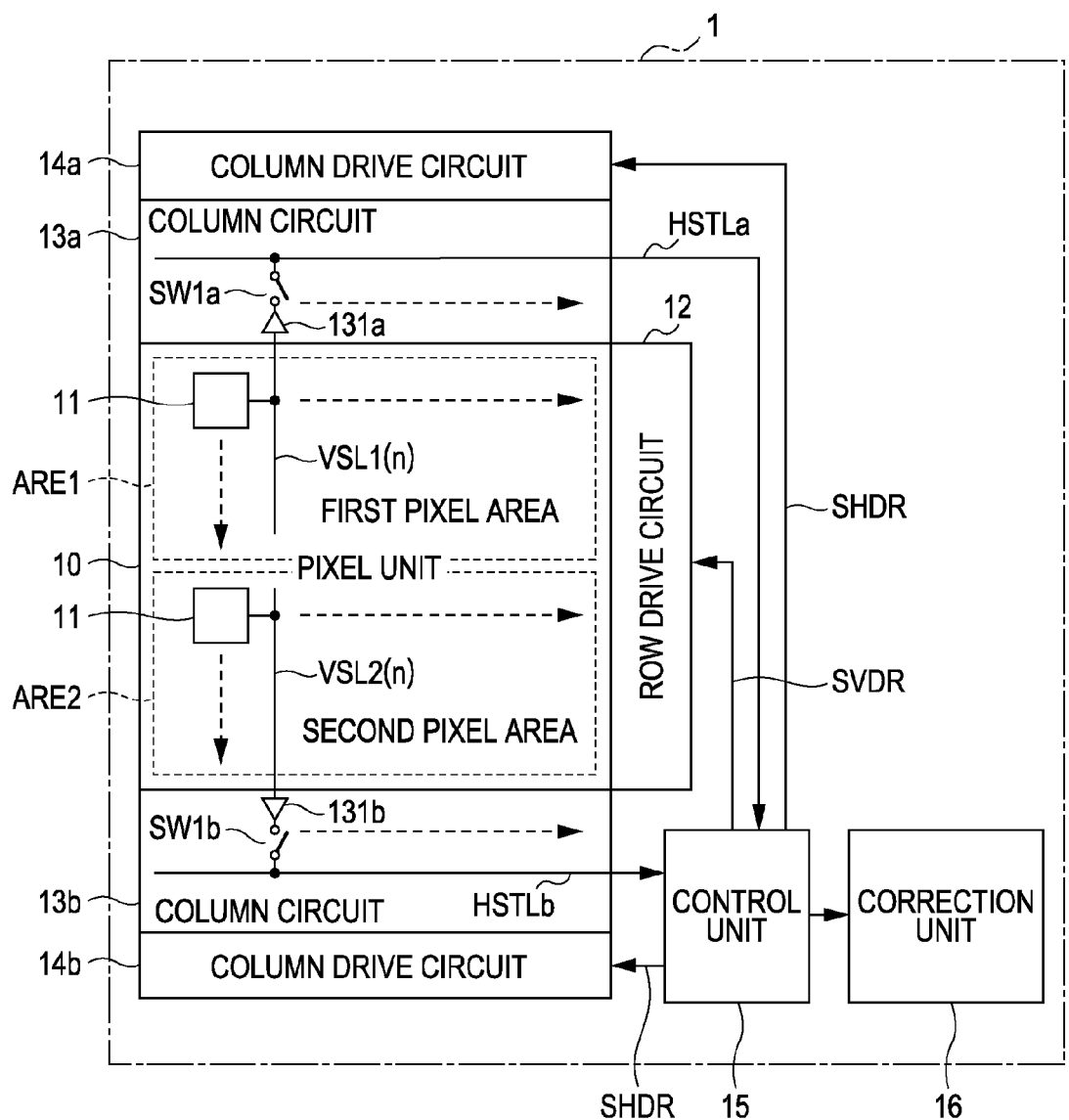
FIG. 1 is a schematic block diagram showing an example of a configuration of a CMOS image sensor according to a first embodiment of the present invention.

FIG. 1 is a schematic block diagram showing an example of a configuration of a CMOS image sensor according to a first embodiment of the present invention.

A CMOS image sensor 1 shown in FIG. 1 includes a pixel unit 10 and a plurality of pixel circuits 11. The CMOS image sensor 1 includes a row drive circuit 12, column circuits 13a and 13b, column drive circuits 14a and 14b, a control unit 15, and a correction unit 16.

Note that the CMOS image sensor 1 corresponds to an image pickup element according to the present invention, and the row drive circuit 12 corresponds to a selection drive unit according to the present invention. Each of the column circuits 13a and 13b corresponds to a processing unit according to the present invention.

As shown in FIG. 1, the column circuit 13a and the column drive circuit 14a are disposed at a side at which the pixel circuits 11 in a first row of the pixel section 10 are arranged (hereinafter, simply referred to as "upper").

The column circuit 13b and the column drive circuit 14b are disposed at a side at which the pixel circuits 11 in a last row of the pixel section 10 are arranged (hereinafter, simply referred to as "lower").

The CMOS image sensor 1 has the column circuits 13a and 13b that are configured as two systems and the column drive circuits 14a and 14b that are configured as two systems, whereby the CMOS image sensor 1 can perform reading out of pixels at a high speed.

Figure 2:
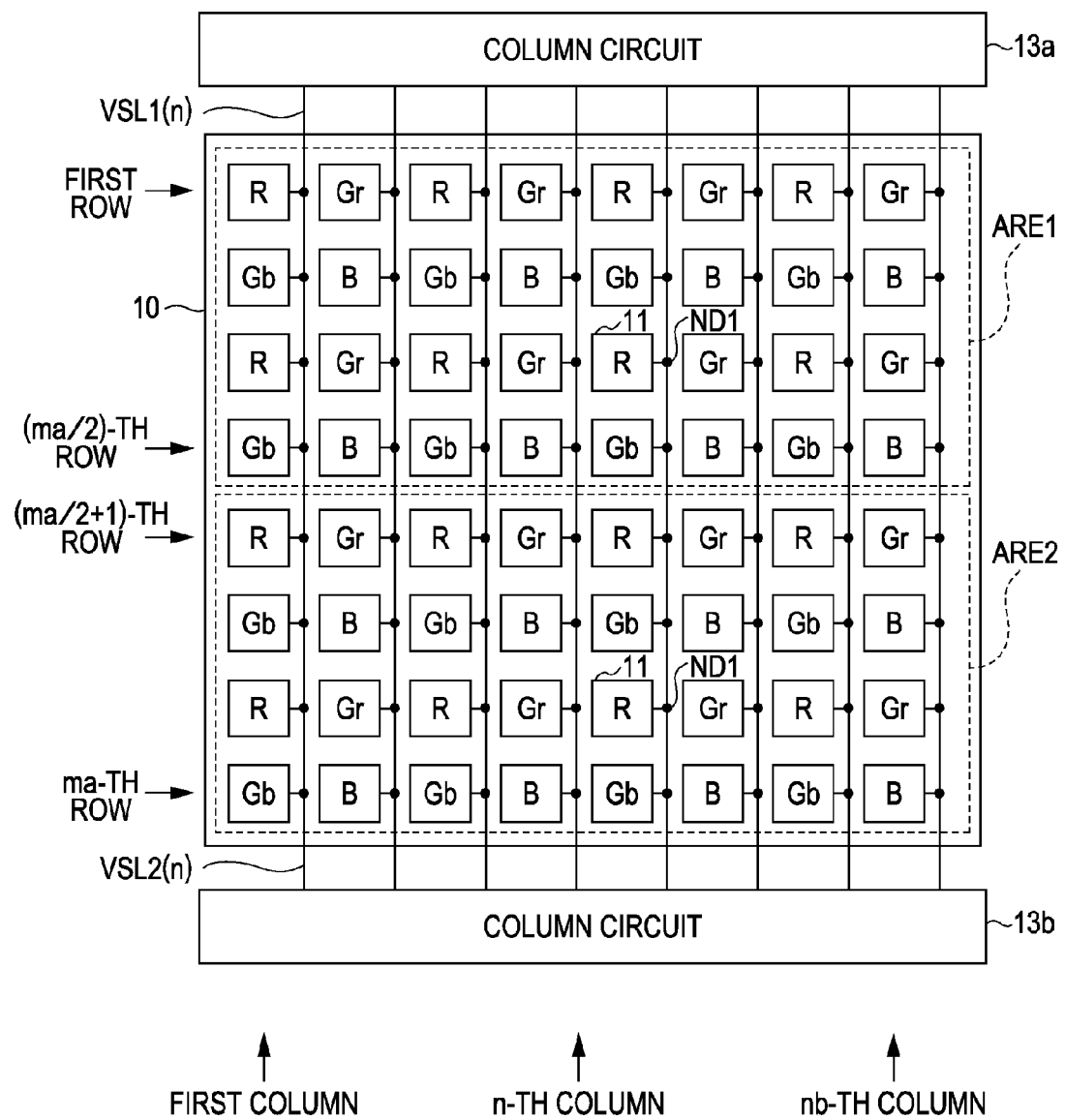
FIG. 2 is a schematic block diagram showing an example of a configuration of a pixel unit in the first embodiment of the present invention.

FIG. 2 is a schematic block diagram showing an example of a configuration of the pixel unit in the first embodiment of the present invention. However, in FIG. 2, only the pixel unit 10 and peripheral units are shown, and signal lines for driving the individual pixel circuits 11 and so forth are omitted.

The pixel unit 10 is a pixel region that receives incident light. As shown in FIG. 2, in the pixel unit 10, the m (rows)×n (columns) pixel circuits 11 are arranged in a matrix form. Note that m and n are positive integers. The maximum value of m is ma (for example, 2048), and the maximum value of n is na (for example, 2048). The CMOS image sensor 1 having such a configuration is referred to as an "X-Y address CMOS image sensor".

Each of the pixel circuits 11 has any one of Gr (green), R (red), B (blue), and Gb (green) color filters, and detects a color corresponding to the color filter. In the pixel unit 10, a Bayer arrangement of pixels is used as shown in FIG. 2.

For example, the pixel circuit 11 having an R color filter is disposed in the first row and a first column, and the pixel circuit 11 having a Gr color filter is disposed in the first row and a second column. The pixel circuit 11 having a Gb color filter is disposed in a second row and the first column, and the pixel circuit 11 having a B color filter is disposed in the second row and the second column. In the Bayer arrangement of pixels, the pixel circuits 11 are arranged in such a manner that such a unit of 2×2 pixel circuits is repeated.

The pixel unit 10 shown in FIG. 2 is divided into a first pixel area ARE1 and a second pixel area ARE2 at an (ma/2)-th row. Hereinafter, the pixel circuit 11 in a certain row, i.e., in an m-th row and an n-th column, is referred to as a "pixel circuit (m, n) 11" where appropriate.

The pixel circuit (m, n) 11 in the first pixel area ARE1 is connected to a corresponding one of vertical signal lines VSL1(n) at a node ND1. The pixel circuit (m, n) 11 in the second pixel area ARE2 is connected to a corresponding one of vertical signal lines VSL2(n) at a node ND1.

Note that the vertical signal lines VSL1(n) and the vertical signal lines VSL2(n) correspond to read signal lines according to the present invention.

One of two ends of each of the vertical signal lines VSL1(n) is connected to the column circuit 13a, and one of two ends of each of the vertical signal lines VSL2(n) is connected to the column circuit 13b. In the pixel unit 10, the other ends of the vertical signal lines in the same column, i.e., the other end of the vertical signal line VSL1(n) and the other end of the vertical signal line VSL2(n), are electrically disconnected from each other.

As described above, the pixel circuits 11 in the first pixel area ARE1 and the pixel circuits 11 in the second pixel area ARE2 are connected to different vertical signal lines.

Accordingly, voltage signals that the pixel circuits 11 in the first pixel area ARE1 output are processed by the upper column circuit 13a, and voltage signals that the pixel circuits 11 in the second pixel area ARE2 output are processed by the lower column circuit 13b. Note that the voltage signals correspond to read signals according to the present invention.

Figure 3:
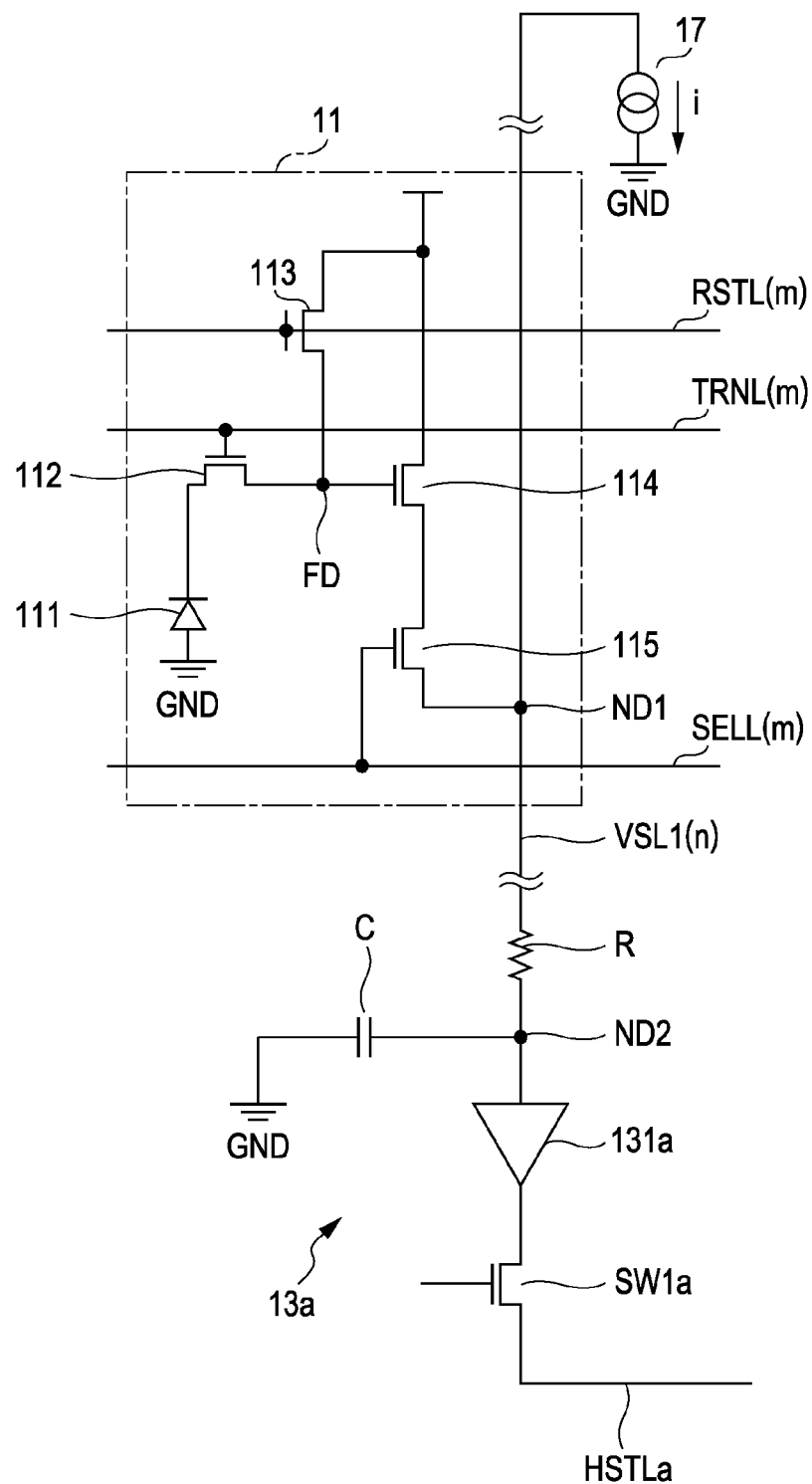
FIG. 3 is an equivalent circuit diagram showing one example of a pixel circuit in the first embodiment of the present invention.

As shown in FIG. 1, the pixel circuits 11 in the same row are commonly connected to a reset signal line RSTL, a transfer signal line TRNL, and a selection signal line SELL (see FIG. 3).

The row drive circuit 12 selects, in accordance with a row selection signal SVDR that is supplied from the control unit 15, a row of the pixel circuits 11 to be driven. The row drive circuit 12 applies a reset signal SRST to the reset signal line RSTL, applies a transfer signal STRN to the transfer signal line TRNL, and applies a selection signal SSEL to the selection signal line SELL, thereby driving the individual pixel circuits 11 that are arranged in the same row (see FIG. 3).

The upper column circuit 13a includes, for example, analog-to-digital (A/D) converters 131a, which are configured using comparators and so forth, switches SW1a, and a memory (not illustrated). Each of the A/D converters 131a and each of the switches SW1a are disposed for a corresponding one of the columns, and the A/D converter 131a is connected to a corresponding one of the vertical signal lines VSL1(n).

The upper column circuit 13a performs the following processing on a voltage signal that is input from the pixel circuit (m, n) 11 in the first pixel area ARE1.

Because the voltage signal that is input via the vertical signal line VSL1(n) is an analog signal, the upper column circuit 13a converts the analog voltage signal to a digital voltage signal using the A/D converter 131a.

Further, the upper column circuit 13a performs a correlated double sampling (CDS) process on the voltage signal. In this case, detection of the voltage signal is performed twice by the upper column circuit 13a in a charge readout period, which is described below, to obtain two voltage signals, and removes fixed pattern noise or the like by obtaining the difference between the two voltage signals (the difference between the amounts of charge).

For example, when the switch SW1a, which is connected to the A/D converter 131a, is turned on, the upper column circuit 13a outputs, via a horizontal transfer line HSTLa to the control unit 15, the voltage signal that has been processed.

The lower column circuit 13b includes, for example, A/D converters 131b, switches SW1b, and a memory (not illustrated) as in the case of the upper column circuit 13a. Each of the A/D converters 131b and each of the switches SW1b are disposed for a corresponding one of the columns, and the A/D converter 131b is connected to a corresponding one of the vertical signal lines VSL2(n).

The lower column circuit 13b performs, on a voltage signal that is input from the pixel circuit (m, n) 11 in the second pixel area ARE2, processing which are the same as that performed by the upper column circuit 13a. The lower column circuit 13b outputs, via a horizontal transfer line HSTLb to the control unit 15, the voltage signal that has been processed.

The upper column drive circuit 14a is configured, for example, using a shift register and so forth. In order to perform reading out of the pixels in units of columns, the upper column drive circuit 14a controls opening and closing of the switches SW1a, which are included in the upper column circuit 13a, in accordance with a column selection signal SHDR that is supplied from the control unit 15.

The lower column drive circuit 14b is also configured, for example, using a shift register and so forth as in the case of the upper column drive circuit 14a. The lower column drive circuit 14b controls opening and closing of the switches SW1b, which are included in the lower column circuit 13b, in accordance with the column selection signal SHDR that is supplied from the control unit 15.

The control unit 15 outputs the row selection signal SVDR to the row drive circuit 12, and outputs the column selection signal SHDR to the upper and lower column drive circuits 14a and 14b. The control unit 15 performs processing such as amplification on the voltage signals that are input via the horizontal transfer lines HSTLa and HSTLb from the upper and lower column circuits 13a and 13b. The control unit 15 outputs, to the correction unit 16, the voltage signals that have been processed.

The correction unit 16 corrects shifts (biases) of a gain or an offset voltage that occur in voltage signals that are output from the pixels in the same column.

Next, the pixel unit 10 and the pixel circuit 11 will be described in detail.

FIG. 3 is an equivalent circuit diagram showing one example of one of the pixel circuits in the first embodiment of the present invention. In FIG. 3, the column circuit 13a is shown together with one of the pixel circuits 11 in the first pixel area ARE1.

Figure 4:
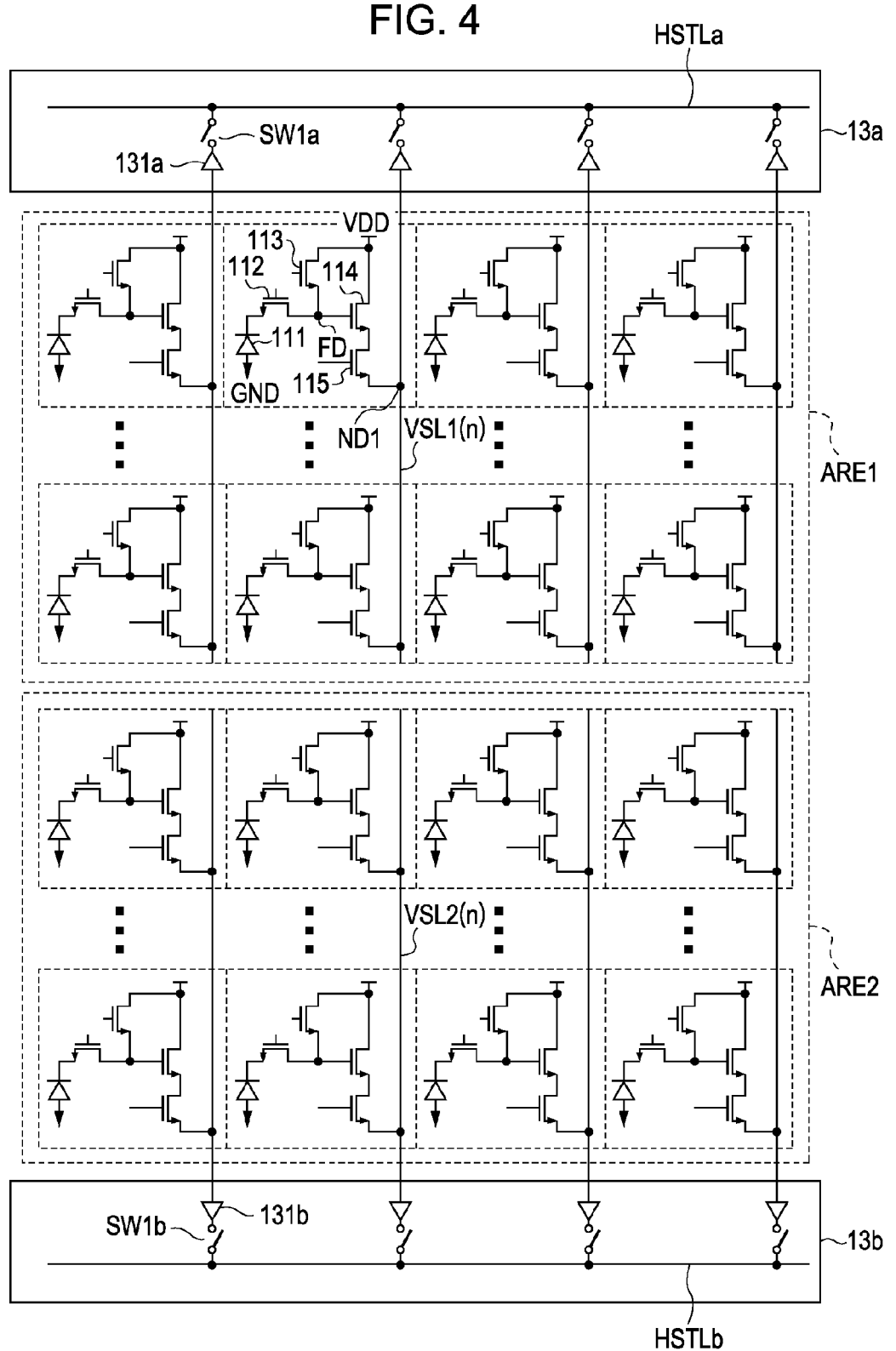
FIG. 4 is a detailed equivalent circuit diagram of the pixel unit shown in FIG. 2.

FIG. 4 is a detailed equivalent circuit diagram of the pixel unit shown in FIG. 2. However, in FIG. 4, only main units that are provided around the pixel unit 10 are shown, and signal lines for driving the individual pixel circuits 11 and so forth are omitted.

As shown in FIG. 3, each of the pixel circuits 11 includes a photoelectric conversion element 111, which is configured, for example, using a photodiode, a transfer transistor 112, a reset transistor 113, an amplification transistor 114, and a selection transistor 115.

Regarding the photoelectric conversion element 111, an anode thereof is connected to the ground (GND), and a cathode thereof is connected to a source of the transfer transistor 112. The photoelectric conversion element 111 performs photoelectric conversion to convert incident light into charge (electron) in accordance with the amount of the incident light, and accumulates the charge.

An n-channel metal oxide semiconductor field effect transistor (MOSFET) is employed as each of the transistors as one example, and the transistors are connected as follows.

In order to transfer, to a floating diffusion FD part, the charge that is accumulated in the photoelectric conversion element 111, the transfer transistor 112 is connected between the cathode of the photoelectric conversion element 111 and the floating diffusion FD part. A transfer signal line TRNL (m) is connected to a gate of the transfer transistor 112.

A drain of the transfer transistor 112, a source of the reset transistor 113, and a gate of the amplification transistor 114 are connected to the floating diffusion FD part.

In order to reset the potential of the floating diffusion FD part to be a power supply voltage VDD, the reset transistor 113 is connected between the floating diffusion FD part and a power source outputting the power supply voltage VDD. A reset signal line RSTL (m) is connected to a gate of the reset transistor 113.

Regarding the amplification transistor 114, a drain thereof is connected to the power source outputting the power supply voltage VDD, and a source thereof is connected to a drain of the selection transistor 115. The amplification transistor 114 amplifies the potential of the floating diffusion FD part.

Regarding the selection transistor 115, in order to be connected in series with the amplification transistor 114, the drain thereof is connected to the source of the amplification transistor 114, a source thereof is connected to the vertical signal line VSL1(n) via a node ND1, and a gate thereof is connected to a selection signal line SELL (m).

A current source 17 is connected to the vertical signal line VSL1(n), and a source follower circuit is configured using the amplification transistor 114 and the current source 17.

A resistor R shown in FIG. 3 indicates a parasitic resistance (wiring resistance) of the vertical signal line VSL1(n) (hereinafter, refereed to as a "parasitic resistance R"). A capacitor C indicates a parasitic capacitance of the vertical signal line VSL1(n) (hereinafter, refereed to as a "parasitic capacitance C"). A node ND2 of the vertical signal line VSL1(n) is connected to an input side of the A/D converter 131a included in the column circuit 13a. The horizontal transfer line HSTLa is connected to an output side of the A/D converter 131a via a transistor that functions as the switch SW1a.

A specific equivalent circuit of the pixel unit 10 is shown in FIG. 4. First, an example of driving (an operation of) a certain row, i.e., the pixel circuit (m, n) 11, that is performed by the row drive circuit 12 will be described. The pixel circuit (m, n) 11 is disposed in the first pixel area ARE1.

Figure 5:
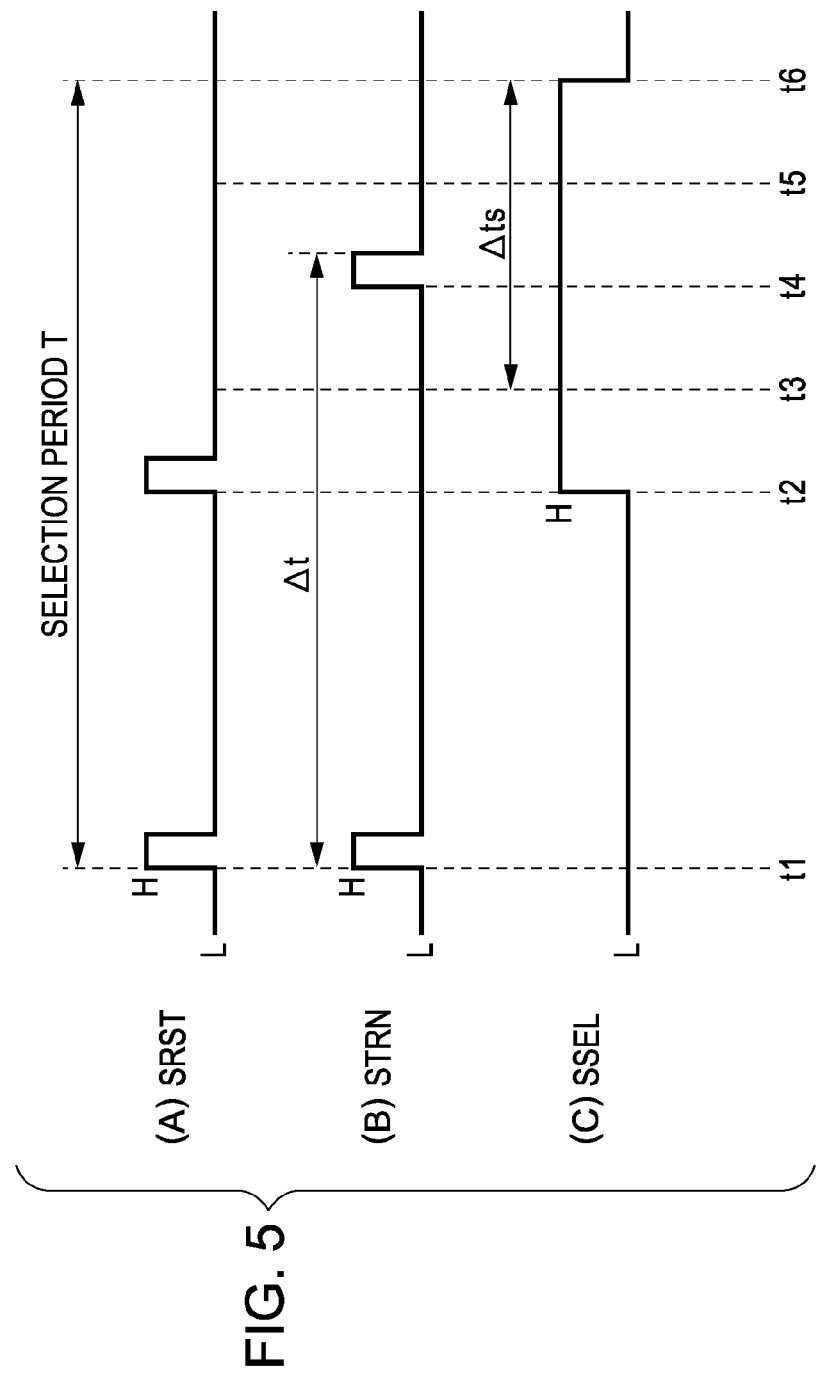
FIG. 5 is a timing diagram showing an example of driving the pixel circuit in the first embodiment of the present invention.

FIG. 5 is a timing diagram showing an example of driving the pixel circuit (m, n) 11 in the first embodiment of the present invention. Part (A) of FIG. 5 illustrates the reset signal SRST, part (B) of FIG. 5 illustrates the transfer signal STRN, and part (C) of FIG. 5 illustrates the selection signal SSEL.

First, a reset operation (an electronic shutter operation) is performed on the pixel circuits 11 in the same row.

At a time t1, the row drive circuit 12 supplies, to the reset signal line RSTL (m), the reset signal SRST that is a pulse signal (having a high level) (see part (A) of FIG. 5). Simultaneously, the row drive circuit 12 supplies, to the transfer signal line TRNL (m), the transfer signal STRN that is a pulse signal (see part (B) of FIG. 5).

Regarding the pixel circuit (m, n) 11, the transfer transistor 112 and the reset transistor 113 are simultaneously turned on in periods corresponding to the pulse widths of the pulse signals. Charge that is accumulated in the photoelectric conversion element 111 is transferred to the floating diffusion FD part, and is drained into the power source outputting the power supply voltage VDD. The potential of the floating diffusion FD part is reset to be the power supply voltage VDD.

After the reset operation, the photoelectric conversion element 111 of the pixel circuit (m, n) 11 starts accumulation of charge, and accumulates charge. A period in which the pixel circuit (m, n) 11 accumulates charge is a period indicated by a charge accumulation time Δt.

At a time t2, the row drive circuit 12 supplies, to the reset signal line RSTL (m), the reset signal SRST that is a pulse signal (see part (A) of FIG. 5). Accordingly, the potential of the floating diffusion FD part is reset once to be the power supply voltage VDD.

At the time t2, the row drive circuit 12 supplies the selection signal SSEL having a high level to the selection signal line SELL (m) until a time t6 at which a charge readout operation finishes (see part (C) of FIG. 5). Accordingly, a state in which the selection transistor 115 of the pixel circuit (m, n) 11 is turned on is held until the charge readout operation performed on the pixel circuits 11 in the same row finishes.

At a time t3, a voltage signal is output to the upper column circuit 13a via the vertical signal line VSL1(n). The upper column circuit 13a detects the voltage signal for a first time.

Because a state in which the transfer transistor 112 is turned off is held, the upper column circuit 13a detects the voltage signal of the floating diffusion FD part in a reset state.

At a time t4, the row drive circuit 12 supplies, to the transfer signal line TRNL (m), the transfer signal STRN that is a pulse signal (see part (B) of FIG. 5).

In a period corresponding to the pulse width of the pulse signal, the transfer transistor 112 is tuned on. In this case, because a state in which the reset transistor 113 is turned off is held, charge that is accumulated in the photoelectric conversion element 111 is transferred to the floating diffusion FD part.

The potential of the floating diffusion FD part is amplified by the amplification transistor 114. As shown in FIG. 3, a source follower circuit is configured using the amplification transistor 114 and the current source 17. A bias current flows between the current source 17 and the amplification transistor 114, and an amplified voltage signal is output to the vertical signal line VSL1(n) via the selection transistor 115 (from the time t4 to the time t6).

Then, the upper column circuit 13a detects the voltage signal for a second time, and removes fixed pattern noise or the like by obtaining the difference between the voltage signal that is obtained for the first time and the voltage signal that is obtained for the second time (the difference between the amounts of charge).

A period in which the above-described voltage signal is output to the vertical signal line VSL1(*n*) is defined a charge readout period Δts (from the time t3 to the time t6). The series of operations in this period is referred to as "reading out of pixels". A period from the time t1 at which the reset operation starts to the time t6 at which the charge readout operation performed on the pixel circuits 11 finishes is defined as a selection (frame) period T for the pixel circuits.

Regarding the vertical signal line VSL1 (*n*), the potential of the node ND2 fluctuates because of an influence of the parasitic resistance R or the parasitic capacitance C. Accordingly, a settling time of the A/D converter 131*a* included in the column circuit 13*a* is changed.

The settling time influences not only the charge readout period Δts but also the frame rate. However, in the following description, it is supposed that the potential of the node ND2 is stabilized at an early stage and a change in the settling time is significantly small.

As shown in FIG. 4, the pixel unit 10 is divided into two regions, i.e., the first pixel area ARE1 and the second pixel area ARE2. Voltage signals that are read from the pixel circuits 11 in the first pixel area ARE1 are subjected to processing such as A/D conversion by the upper column circuit 13*a*, and voltage signals that are read from the pixel circuits 11 in the second pixel area ARE2 are subjected to processing such as A/D conversion by the lower column circuit 13*b*.

Figure 6:
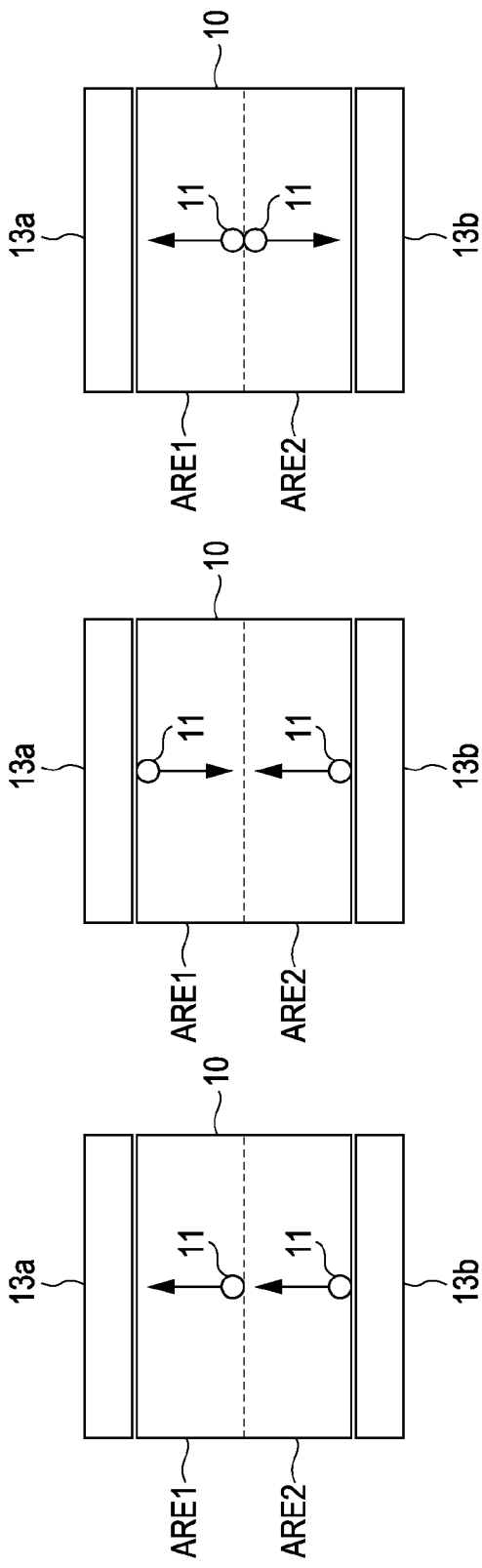
FIGS. 6A to 6C are schematic illustrations for explaining examples of driving methods that are performed by a row drive circuit in the first embodiment of the present invention.

In this case, the row drive circuit 12 shown in FIG. 1 can drive the pixel circuits in the individual pixel regions using three driving (scanning) methods as illustrated in FIGS. 6A to 6C.

FIGS. 6A to 6C are schematic illustrations for explaining examples of the driving methods that are performed by the row drive circuit in the first embodiment of the present invention. FIG. 6A illustrates the first driving method, FIG. 6B illustrates the second driving method, and FIG. 6C illustrates the third driving method.

In the first driving method, as shown in FIG. 6A, the row drive circuit 12 sequentially drives the pixel circuits 11 in units of rows in a direction from a last row (the (ma/2)-th row) to a first row of the first pixel area ARE1. Simultaneously, the row drive circuit 12 sequentially drives the pixel circuits 11 in units of rows in a direction from a last row (an ma-th row) to a first row (an (ma/2+1)-th row) of the second pixel area ARE2.

In the second driving method, as shown in FIG. 6B, the row drive circuit 12 sequentially drives the pixel circuits 11 in units of rows in a direction from the first row to the last row (the (ma/2)-th row) of the first pixel area ARE1. Simultaneously, the row drive circuit 12 sequentially drives the pixel circuits 11 in units of rows in the direction from the last row (the ma-th row) to the first row (the (ma/2+1)-th row) of the second pixel area ARE2.

In the third driving method, as shown in FIG. 6C, the row drive circuit 12 sequentially drives the pixel circuits 11 in units of rows in the direction from the last row (the (ma/2)-th row) to the first row of the first pixel area ARE1. Simultaneously, the row drive circuit 12 sequentially drives the pixel circuits 11 in units of rows in a direction from the first row (the (ma/2+1)-th row) to the last row (the ma-th row) of the second pixel area ARE2.

In any of the driving methods, the row drive circuit 12 simultaneously drives the pixel circuits 11 in the first pixel area ARE1 and the pixel circuits 11 in the second pixel area ARE2. However, the row drive circuit 12 may alternately drive the pixel circuits 11 in the first pixel area ARE1 and the pixel circuits 11 in the second pixel area ARE2.

In this case, the row drive circuit 12 drives the pixel circuits 11 in the last row (the (ma/2)-th row) of the first pixel area ARE1, and then drives the pixel circuits 11 in the last row (the ma-th row) of the second pixel area ARE2. After that, the row drive circuit 12 repeats such a drive operation, thereby sequentially driving the pixel circuits in the individual pixel regions in units of rows.

Any one of the first to third driving methods can be preferably employed. Hereinafter, an operation of the CMOS image sensor 1 in a case in which the first driving method is employed will be described with reference to FIG. 7.

Figure 7:
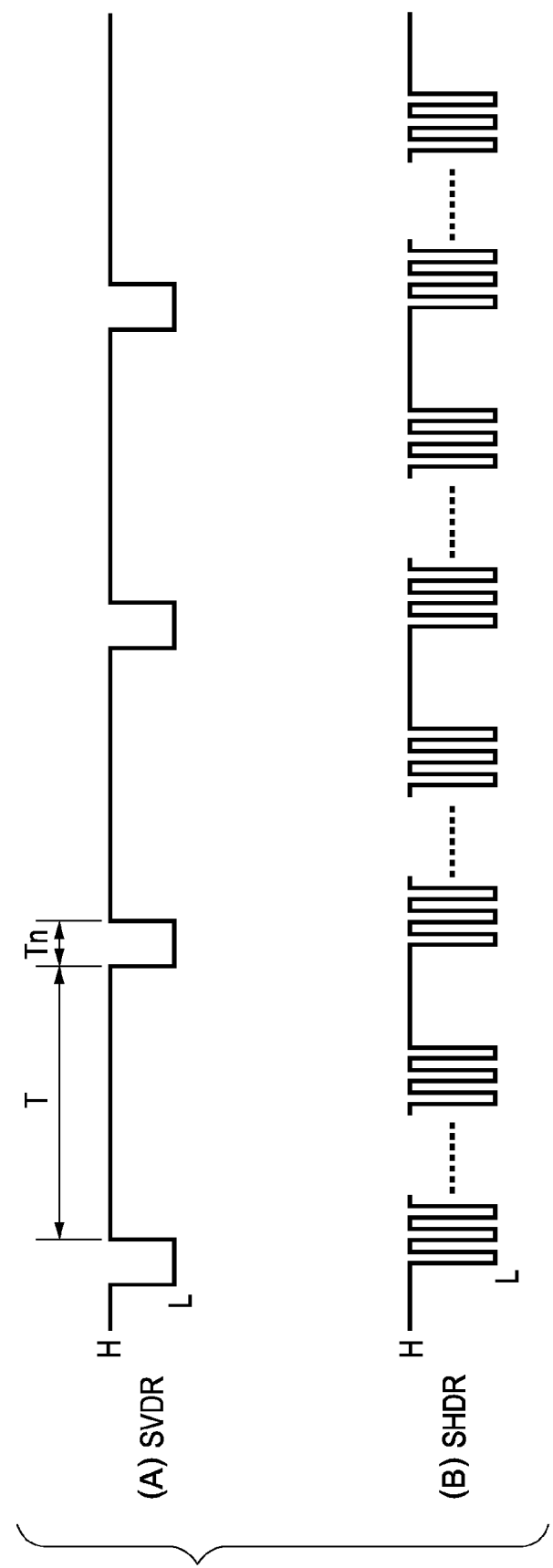
FIG. 7 is a timing diagram illustrating an example of an operation of the CMOS image sensor according to the first embodiment of the present invention.
Figure 10E:
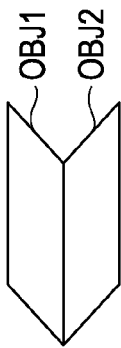
FIG. 10A to 10F are schematic illustrations showing examples of picked-up images that are obtained by the CMOS image sensor according to the first embodiment of the present invention.
Figure 10C:
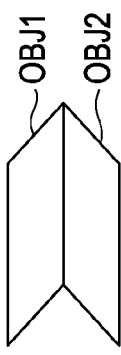
Figure 10A:
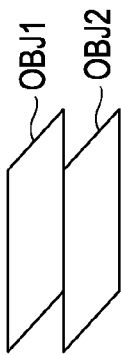
Figure 10F:
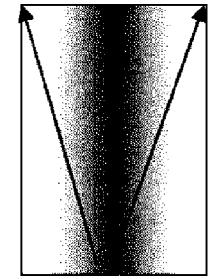
Figure 10D:
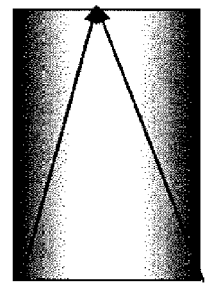
Figure 10B:
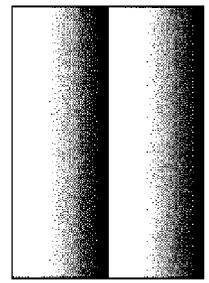

FIG. 7 is a timing diagram illustrating an example of the operation of the CMOS image sensor according to the first embodiment of the present invention. Part (A) of FIG. 7 illustrates the row selection signal SVDR, and part (B) of FIG. 7 illustrates the column selection signal SHDR. Times shown in FIG. 7 correspond to the times shown in FIG. 5.

The row drive circuit 12 sequentially drives the pixel circuits 11 in units of rows in the direction from the last row (the (ma/2)-th row) to the first row of the first pixel area ARE1. Simultaneously, the row drive circuit 12 sequentially drives the pixel circuits 11 in units of rows in the direction from the last row (the ma-th row) to the first row (the (ma/2+1)-th row) of the second pixel area ARE2.

In other words, the row drive circuit 12 simultaneously drives the pixel circuits 11 in the first pixel area ARE1 and the pixel circuits 11 in the second pixel area ARE2.

In the following description, driving of the pixel circuits 11 in the first pixel area ARE1 will be described as an example.

When the selection period T starts for the pixel circuits 11 in the last row (the (ma/2)-th row) (at the time t1), a first step and a second step that are described below are performed.

In the first step, the control unit 15 outputs the row selection signal SVDR having a high level to the row drive circuit 12. When the row drive circuit 12 receives the row selection signal SVDR, the row drive circuit 12 drives the pixel circuits 11 in the last row (the (ma/2)-th row), and performs reading out of the pixels.

Then, the second step starts in a period Tn after driving of the pixel circuits 11 finishes.

In the second step, the control unit 15 outputs the column selection signal SHDR that is continuously formed using short pulses to the upper column drive circuit 14*a*.

Accordingly, the switches SW1*a* included in the upper column circuit 13*a* are sequentially turned on and off in units of columns in synchronization with the column selection signal SHDR.

For example, regarding the n-th column, a voltage signal is input from the pixel circuit (m, n) 11 that is connected to the node ND1 of the vertical signal line VSL1(*n*).

Then, the upper column circuit 13*a* performs processing such as A/D conversion and the CDS process on the voltage signal. When the switch SW1*a* is turned on, the upper column circuit 13*a* outputs, to the control unit 15 via the horizontal transfer line HSTLa, the voltage signal that has been processed.

With the foregoing, the second step finishes. Next, the first and second steps are repeatedly performed on the pixel circuits 11 in the rows starting with the next row (an (ma/2−1)-th row) and ending with the first row.

The first and second steps are also repeatedly performed on the pixel circuits 11 in the rows starting with the last row (the ma-th row) and ending with the first row (the (ma/2+1)-th row) of the second pixel area ARE2.

In the first step, the control unit 15 outputs the row selection signal SVDR having a high level to the row drive circuit 12. In the second step, the control unit 15 outputs, to the lower column drive circuit 14*b*, the column selection signal SHDR that is continuously formed using short pulses.

Accordingly, the switches SW1*b* included in the lower column circuit 13*b* are sequentially turned on and off in units of columns in synchronization with the column selection signal SHDR. The lower column circuit 13*b* outputs, to the control unit 15 via the horizontal transfer line HSTLb, voltage signals that have been subjected to processing such as A/D conversion and the CDS process by the lower column circuit 13*b*.

The voltage signals are sequentially input from the pixel circuits 11 in the first pixel area ARE1 and the second pixel area ARE2 to the control unit 15.

Since the pixel unit 10 is divided into two pixel regions, a time lag (a time difference) between times from when reading out of the pixels starts to when signal processing is performed by the column circuits 13*a* and 13*b* or the like easily occurs in the first pixel area ARE1 and the second pixel area ARE2.

As a result, shifts of a gain or an offset voltage, which cause a focal plane phenomenon to occur, occur in the voltage signals (image data items) that are obtained from the two pixel regions. For this reason, the correction unit 16 corrects the shifts of a gain or an offset voltage.

Here, a CMOS image sensor in which the pixel unit 10 is not divided into two regions will be described.

FIG. 8 is a schematic block diagram of a main portion of a typical CMOS image sensor to show the CMOS image sensor as an example.

A typical CMOS image sensor 100 includes a column circuit 102. In a pixel unit 101, pixel circuits 103 are arranged in a matrix form, and each of vertical signal lines 104 is connected to the pixel circuits 103 in a corresponding one of columns.

Regarding the differences between the typical CMOS image sensor 100 and the CMOS image sensor 1 according to the first embodiment of the present invention, in the CMOS image sensor 100, the pixel unit 101 is not divided into two regions, and the vertical signal lines 104 are not electrically insulated in the pixel unit 101. Regarding the number of the pixel circuits 103, arrangement of the pixel circuits 103, and so forth, the typical CMOS image sensor 100 has a configuration the same as that of the CMOS image sensor 1 according to the first embodiment of the present invention.

In the typical CMOS image sensor 100, the row drive circuit 105 sequentially drives the pixel circuits 103 in a direction from a last row to a first row. As a result, picked-up images that were obtained are shown in FIGS. 9A to 9C.

FIGS. 9A to 9C are schematic illustrations showing examples of the picked-up images that were obtained by the CMOS image sensor shown in FIG. 8.

Part (A) of FIG. 9 is a schematic illustration showing an ideal picked-up image. On the other hand, in a case in which an image of an object moving at a high speed or the like was picked up, regarding an object OBJ in the picked-up image that was obtained by the typical CMOS image sensor 100, the entire image is distorted into a parallelogram shape as shown in part (B) of FIG. 9. The distortion of the object OBJ is called a focal plane phenomenon.

Since the difference between the charge accumulation times or the like occurs because of a scheme for reading out of the pixels, shading shown in a shaded portion of part (C) of FIG. 9 or the like, which is caused by dark current noise or the like, occurs. Such dark current noise often occurs in an upper portion of a pixel region, i.e., a portion of the pixel region that is most distant from the column circuit 102 shown in FIG. 8.

On the other hand, with the CMOS image sensor 1 according to the first embodiment, picked-up images such as picked-up images shown in FIGS. 10A to 10F can be obtained.

FIGS. 10A to 10F are schematic illustrations showing examples of the picked-up images that were obtained by the CMOS image sensor according to the first embodiment of the present invention.

When the first driving method is employed, distortion shown in part (A) of FIG. 10 occurs in the object shown in the picked-up image that was obtained by the CMOS image sensor.

Reference numeral "OBJ1" shown in part (A) of FIG. 10 denotes a portion of the object OBJ corresponding to the first pixel area ARE1, and reference numeral "OBJ2" shown in part (A) of FIG. 10 denotes a portion of the object OBJ corresponding to the second pixel area ARE2.

The distortion occurs because of loss of concurrence of the charge accumulation times or the like. However, the distortion does not occur over the entire object, and the degree of the distortion is lower than the degree of the distortion in the image that was picked up by the typical CMOS image sensor 100 (see part (A) of FIG. 9).

The reason for this is as follows: the length of the vertical signal lines is shorter than (substantially half) that of the vertical signal lines in the CMOS image sensor 100 of the related art; the settling time is reduced because the parasitic resistance R or the parasitic capacitance C is reduced by half, and the pixel readout time is reduced; and the distortion caused by the focal plane phenomenon occurs only in the first pixel area ARE1 and the second pixel area ARE2.

As described above, with the CMOS image sensor 1, even when the focal plane phenomenon occurs, distortion does not occur over the entire picked-up image.

Noise such as dark current occurs. However, the noise occurs in bottom portions of the first pixel area ARE1 and the second pixel area ARE2, but is not high. The noise is lower than that in the image that was picked up by the typical CMOS image sensor 100.

The operation of the CMOS image sensor 1 using the first driving method is described above. Even when the second driving method or the third driving method is employed, only the sequence in which the pixel circuits 11 are driven by the row drive circuit 12 in the row direction is different, and the operation of the CMOS image sensor 1 is common.

By the CMOS image sensor 1 employing the second driving method, the picked-up image shown in part (C) of FIG. 10 can be obtained. As in the case of part (A) of FIG. 10, distortion does not occur over the entire object, and the degree of the distortion is lower than that of the distortion in the image that was picked up by the typical CMOS image sensor 100.

Noise such as dark current occurs in the picked-up image as shown in part (D) of FIG. 10. The noise also occurs in ends of the first pixel area ARE1 and the second pixel area ARE2, but is not high. The noise is lower than that in the image that was picked up by the typical CMOS image sensor 100.

By the CMOS image sensor 1 employing the third driving method, the picked-up image shown in part (E) of FIG. 10 can be obtained. As in the case of part (A) of FIG. 10, distortion does not occur over the entire object, and the degree of the distortion is lower than that of the distortion in the image that was picked up by the typical CMOS image sensor 100.

Noise such as dark current occurs in the picked-up image as shown in part (F) of FIG. 10. The noise also occurs in central portions of the first pixel area ARE1 and the second pixel area ARE2, but is not high. The noise is lower than that in the image that was picked up by the typical CMOS image sensor 100.

The typical CMOS image sensor 100 performs driving of the pixel circuits 103 and reading out of pixels in accordance with a timing diagram shown in FIG. 11.

FIG. 11 is a timing diagram illustrating an example of an operation of the typical CMOS image sensor shown in FIG. 8.

The row drive circuit 105 sequentially drives the pixel circuits 103 in units of rows in the direction from the last row to the first row of the pixel unit 101. In a period in which the level of the row selection signal SVDR is high, the row drive circuit 105 drives the pixel circuits 103 in an m-th row, and performs reading out of the pixels. Then, the column circuit 102 receives the column selection signal SHDR that is continuously formed using short pulses, and sequentially performs reading out of the pixels in units of columns.

In this manner, in the CMOS image sensor 100 of the related art, the single column circuit 102 performs reading out of the pixels on all of the pixel circuits 103 in the pixel unit 101 in units of rows.

On the other hand, one selection (frame) period T of the CMOS image sensor 1 according to the first embodiment is substantially half one selection period T1 of the CMOS image sensor 100. In other words, the pixel readout time of the CMOS image sensor 1 is half that of the typical CMOS image sensor 100.

The reason for this is that the pixel unit 10 is divided into two regions and reading out of the pixels is performed by the column circuits 13a and 13b that are configured as two systems.

Note that, in the first embodiment, the pixel unit 10 is divided at the (ma/2)-th row so that the two divided regions include the same number of pixel circuits 11. However, the pixel unit 10 can be preferably divided at any row, e.g., an (ma/3)-th row.

As described above in detail, according to the first embodiment, the CMOS image sensor 1 includes the plurality of vertical signal lines VSL1 and VSL2, and the pixel unit 10 in which the plurality of pixel circuits 11 are arranged in a matrix form.

The pixel unit 10 is divided into two pixel regions, i.e., the first pixel area ARE1 and the second pixel area ARE2. The plurality of pixel circuits 11 are divided into two as a plurality of pixel circuits 11 in the first pixel area ARE1 and a plurality of pixel circuits 11 in the second pixel area ARE2, and the plurality of pixel circuits 11 in the first pixel area ARE1 and the plurality of pixel circuits 11 in the second pixel area ARE2 are divided into groups so that each of the groups is provided in a corresponding one of the columns.

In the CMOS image sensor 1, the pixel circuits 11 in each of the groups, each of the groups being provided in a corresponding one of the columns, in the pixel unit 10 are connected to a corresponding one of the vertical signal lines VSL1 and VSL2. The plurality of pixel circuits 11, which are divided into groups, output voltage signals to the vertical signal lines VSL1 and VSL2, which are connected to the pixel circuits 11, and the CMOS image sensor 1 includes the processing units that process the voltage signals.

Accordingly, not only the focal plane phenomenon, which is caused by shifts between the pixel readout times for the individual columns or shifts between the charge accumulation times, can be reduced, but also the speed at which reading out of the pixels is performed can be increased.

Thus, even when the number of pixels is increased, the CMOS image sensor that does not sacrifice the frame rate or the light-receiving area (of the pixel unit) can be provided.

There is an advantage that the configuration of the above-described CMOS image sensor can be easily realized.

Figure 12:
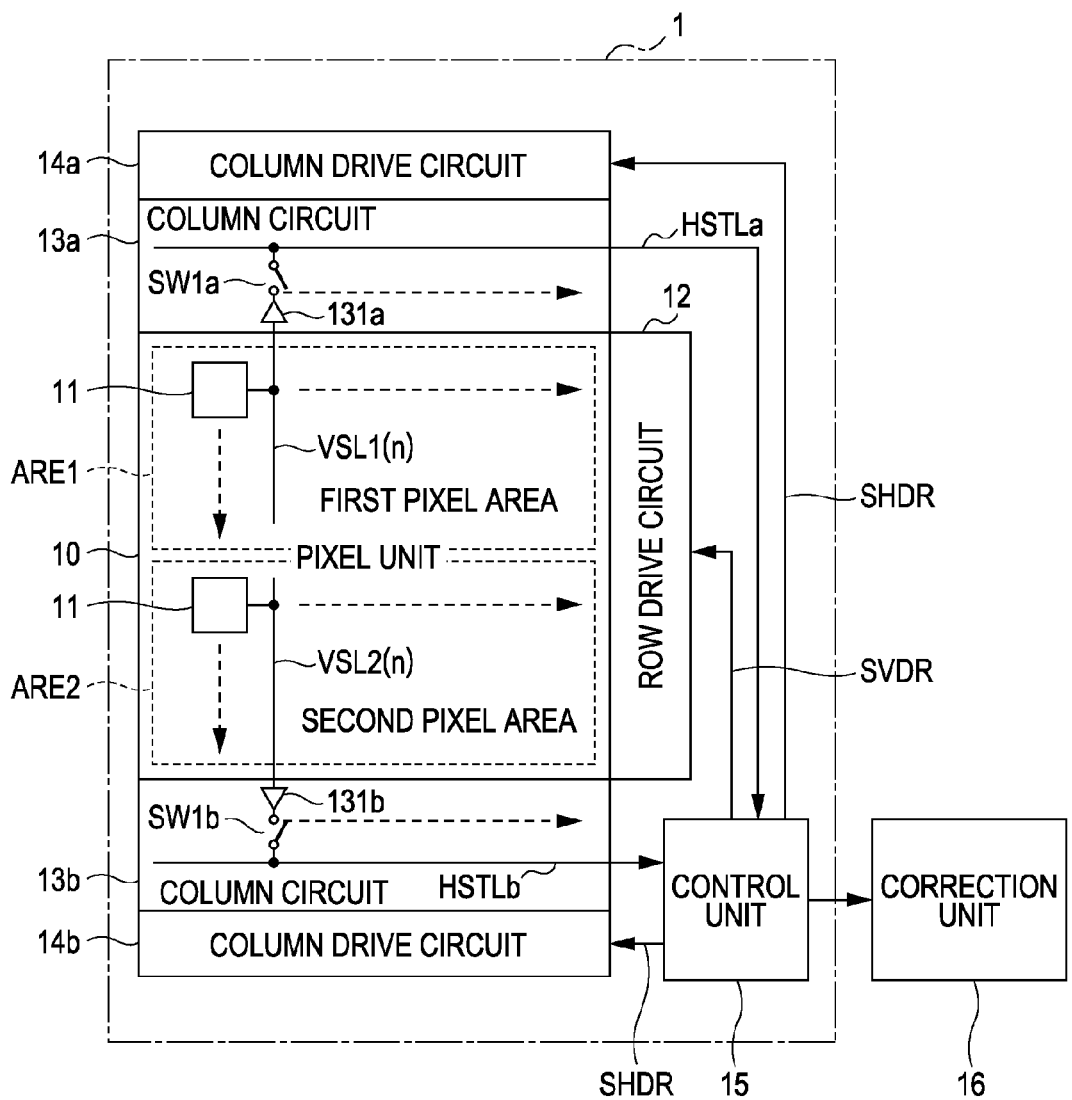
FIG. 12 is a schematic block diagram showing an example of disposition of a correction unit in the first embodiment of the present invention.

FIG. 12 is a schematic block diagram showing an example of displacement of the correction unit in the first embodiment of the present invention.

As shown in FIG. 12, the correction unit 16 can be disposed outside the CMOS image sensor 1.

Second Embodiment

In a second embodiment, instead of division of the pixel unit 10 into two pixel regions, the number of vertical signal lines is doubled, whereby the focal plane phenomenon is reduced and the speed at which reading out of pixels is performed is increased. Hereinafter, the differences between the second embodiment and the first embodiment will be described.

Figure 13:
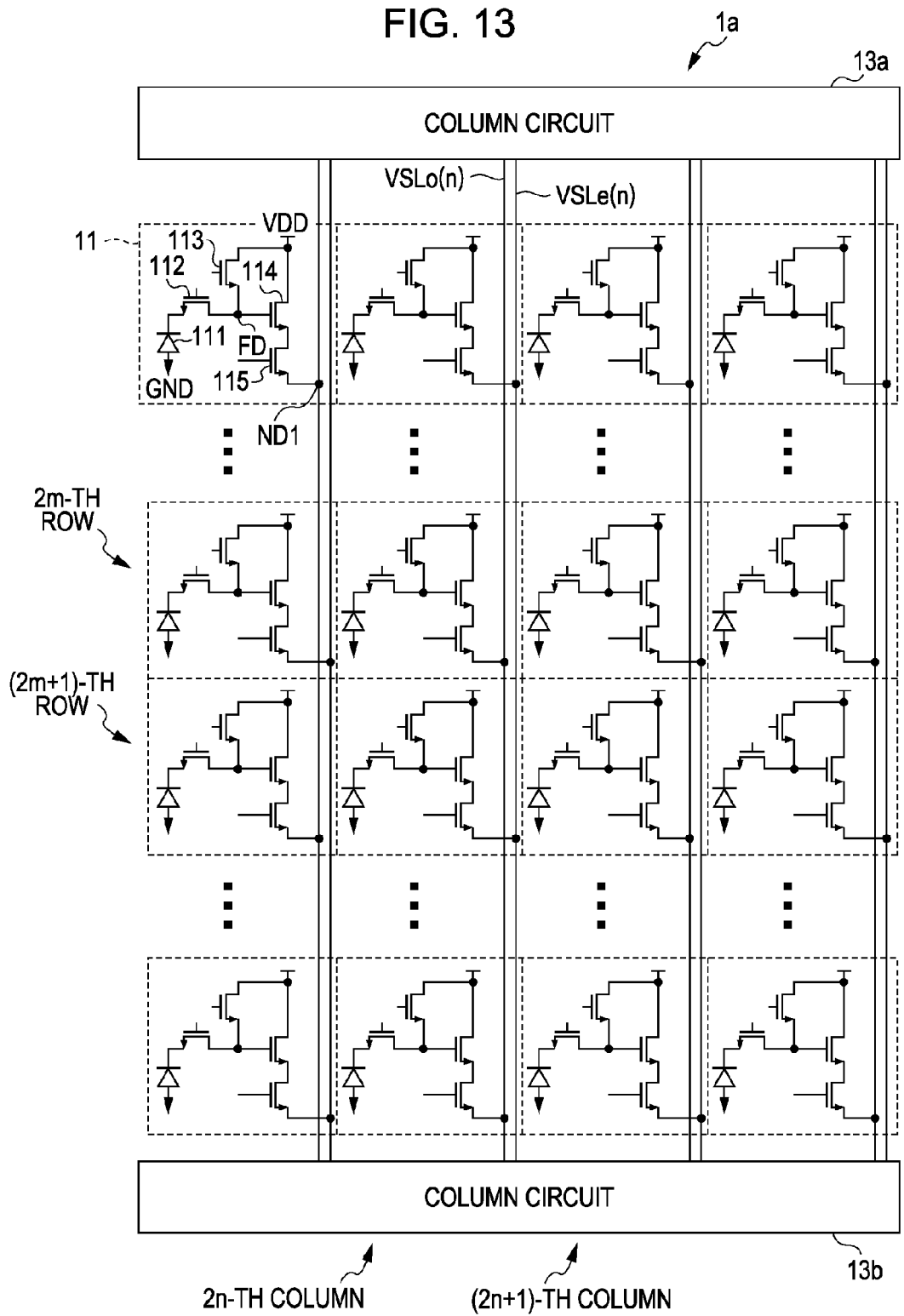
FIG. 13 is a schematic block diagram showing an example of a configuration of a CMOS image sensor according to a second embodiment of the present invention.

FIG. 13 is a schematic block diagram showing an example of a configuration of a CMOS image sensor according to the second embodiment of the present invention.

As shown in FIG. 13, in a CMOS image sensor 1a, two vertical signal lines are disposed for each of columns.

More specifically, a pixel circuit (2m+1, 2n+1) 11 in an odd-numbered ((2 m+1)-th) row and an odd-numbered ((2n+1)-th) column is connected to a corresponding one of vertical signal lines VSLo(n) via a node ND1, and a pixel circuit (2m+1, 2n) 11 in the odd-numbered row and an even-numbered (2n-th) column is connected to a corresponding one of vertical signal lines VSLe(n) via a node ND1.

Note that the vertical signal lines VSLo(n) and VSLe(n) correspond to read signal lines according to the present invention.

On the other hand, a pixel circuit (2m, 2n+1) 11 in an even-numbered (2m-th) row and the odd-numbered column is connected to a corresponding one of the vertical signal lines VSLe(n) via a node ND1, and a pixel circuit (2m, 2n) 11 in the even-numbered row and the even-numbered column is connected to a corresponding one of the vertical signal lines VSLo(n) via a node ND1.

As described above, each of pixel circuits 11 in the same row is connected to alternately either a corresponding one of the vertical signal lines VSLo(n) or a corresponding one of the vertical signal lines VSLe(n) in a corresponding one of the columns. Both an upper column circuit 13a and a lower column circuit 13b are connected to the vertical signal lines VSLo(n) and the vertical signal lines VSLe(n).

Accordingly, the upper column circuit 13a performs processing on voltage signals that are output from the pixel circuits 11 which are commonly connected to each of the vertical signal lines VSLo(n), and the lower column circuit 13b performs processing on voltage signals that are output from the pixel circuits 11 which are commonly connected to each of the vertical signal lines VSLe(n).

Conversely, the upper column circuit 13a may perform processing on voltage signals that are output from the pixel circuits 11 which are commonly connected to each of the vertical signal lines VSLe(n), and the lower column circuit 13b may perform processing on voltage signals that are output from the pixel circuits 11 which are commonly connected to each of the vertical signal lines VSLo(n).

Although a pixel unit 10 is not divided into two pixel regions, which is different from the first embodiment, the number of pixel circuits 11 that are connected to one vertical signal line is the same as the number of pixel circuits 11 in the first embodiment, i.e., ma/2. In other words, the number of selection transistors 115 that are connected to one vertical signal line is half the number of selection transistors in the typical CMOS image sensor 100 shown in FIG. 8.

Accordingly, even when a parasitic resistance R of each of the vertical signal lines is substantially equal to a parasitic resistance in the case in which all of the pixel circuits 11 in one column are connected to one vertical signal line, the parasitic resistance of each of the vertical signal lines becomes half. As a result, the focal plane phenomenon, which is caused by shifts between the pixel readout times for the individual columns or shifts between the charge accumulation times, can be reduced.

An operation of the CMOS image sensor 1a is the same as that of the CMOS image sensor 1 according to the first embodiment. For example, a row drive circuit 12 sequentially drives the pixel circuits 11 in units of rows in a direction from a last row (an ma-th row) to a first row.

The upper column circuit 13a performs processing voltage signals that are output from the pixel circuits 11 which are commonly connected to each of the vertical signal lines VSLo (n), and the lower column circuit 13b performs processing voltage signals that are output from the pixel circuits 11 which are commonly connected to each of the vertical signal lines VSLe(n).

As described above, according to the second embodiment, not only the focal plane phenomenon, which is caused by shifts between the pixel readout times for the individual columns or shifts between the charge accumulation times, can be reduced, but also the speed at which reading out of the pixels is performed can be increased.

Note that three or more vertical signal lines may be disposed for each of the columns, thereby reducing the parasitic resistance and the parasitic capacitance of each of the vertical signal lines, so that the focal plane phenomenon can be further reduced and the speed at which reading out of the pixels is performed can be further increased.

Third Embodiment

A third embodiment is a combination of the first embodiment and the second embodiment. In other words, in the third embodiment, a pixel unit 10 is divided into two pixel regions, and two vertical signal lines are disposed for each of columns, whereby the focal plane phenomenon can be reduced and the speed at which reading out of pixels is performed can be increased.

Figure 14:
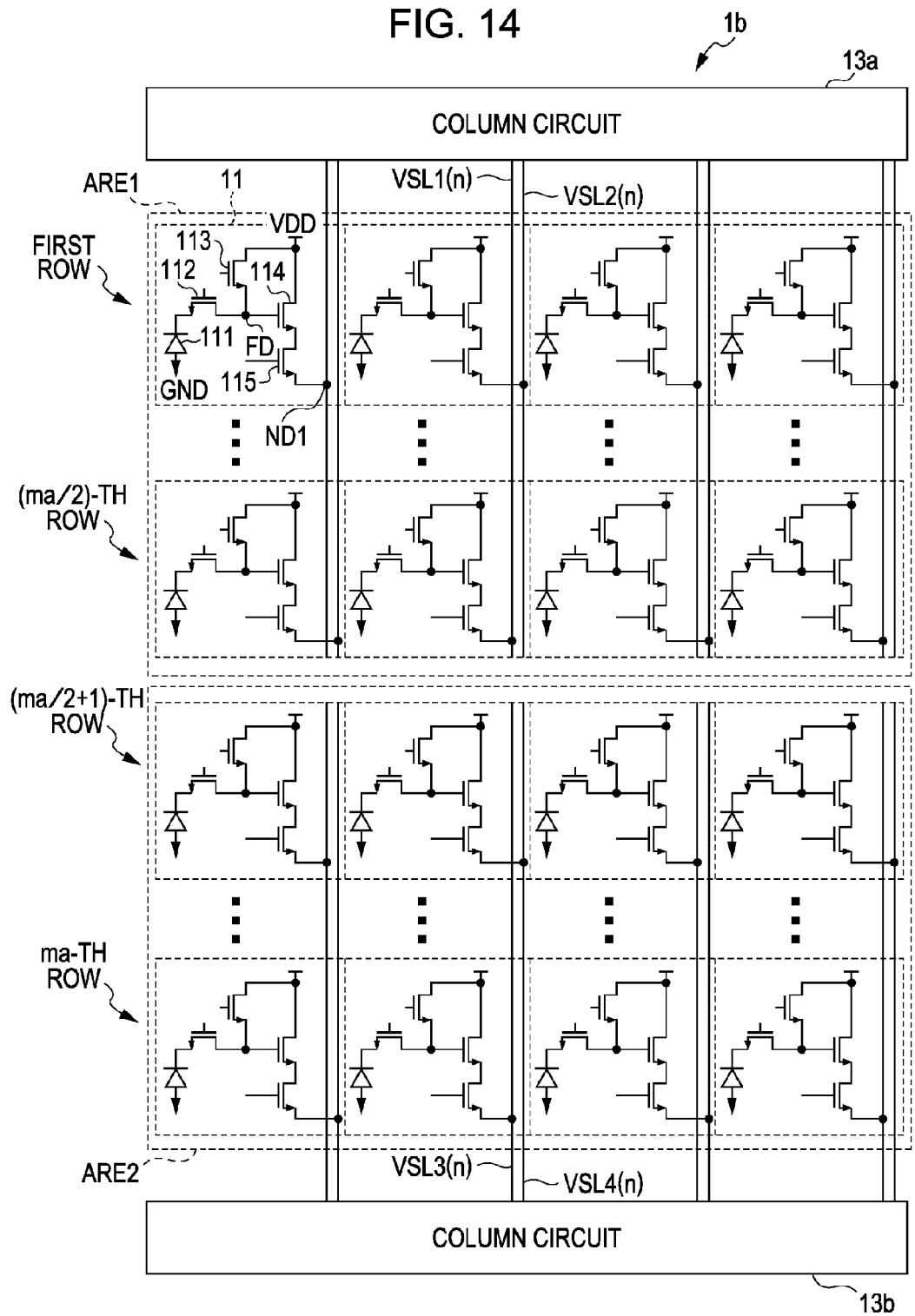
FIG. 14 is a schematic block diagram showing an example of a configuration of a CMOS image sensor according to a third embodiment of the present invention.

FIG. 14 is a schematic block diagram showing an example of a configuration of a CMOS image sensor according to the third embodiment of the present invention.

As shown in FIG. 14, in a CMOS image sensor 1b, a pixel unit 10 is divided into a first pixel area ARE1 and a second pixel area ARE2.

In the first pixel area ARE1, a pixel circuit (2m+1, 2n+1) 11 in an odd-numbered row and an odd-numbered column is connected to a corresponding one of vertical signal lines VSL1($n$) via a node ND1, and a pixel circuit (2m+1, 2n) 11 in the odd-numbered row and an even-numbered column is connected to a corresponding one of vertical signal lines VSL2($n$) via a node ND1.

On the other hand, in the first pixel area ARE1, a pixel circuit (2m, 2n) 11 in an even-numbered row and the even-numbered column is connected to a corresponding one of the vertical signal lines VSL1($n$) via a node ND1, and a pixel circuit (2m, 2n+1) 11 in the even-numbered row and the odd-numbered column is connected to a corresponding one of the vertical signal lines VSL2($n$) via a node ND1.

In the second pixel area ARE2, a pixel circuit (2m+1, 2n+1) 11 in an odd-numbered row and an odd-numbered column is connected to a corresponding one of vertical signal lines VSL3($n$) via a node ND1, and a pixel circuit (2m+1, 2n) 11 in the odd-numbered row and an even-numbered column is connected to a corresponding one of vertical signal lines VSL4($n$) via a node ND1.

On the other hand, in the second pixel area ARE2, a pixel circuit (2m, 2n) 11 in an even-numbered row and the even-numbered column is connected to a corresponding one of the vertical signal lines VSL3($n$) via a node ND1, and a pixel circuit (2m, 2n+1) 11 in the even-numbered row and the odd-numbered column is connected to a corresponding one of the vertical signal lines VSL4($n$) via a node ND1.

Note that the vertical signal lines VSL1($n$) to VSL4($n$) correspond to read signal lines according to the present embodiment.

An operation of the CMOS image sensor 1b is the same as that of the CMOS image sensor 1 according to the first embodiment. When the first driving method is employed from among the first to third driving methods, the operation of the CMOS image sensor 1b is as follows.

A row drive circuit 12 sequentially drives pixel circuits 11 in units of rows in a direction from a last row (an (ma/2)-th) row) to a first row of the first pixel area ARE1. Simultaneously, the row drive circuit 12 sequentially drives pixel circuits 11 in units of rows in a direction from a last row (an ma-th row) to a first row (an (ma/2+1)-th row) of the second pixel area ARE2. In this case, the first step and the second step are repeated in units of rows.

As described above with the CMOS image sensor 1b shown in FIG. 14, when the pixel unit 10 is divided into two pixel regions and two vertical signal lines are disposed for each of the columns, both the parasitic resistance and the parasitic capacitance of each of the vertical signal lines are half the parasitic resistance and the parasitic capacitance of each of the vertical signal lines in the typical CMOS image sensor.

Thus, according to the third embodiment, not only the focal plane phenomenon, which is caused by shifts between the pixel readout times for the individual columns or shifts between the charge accumulation times, can be further reduced, but also the speed at which reading out of the pixels is performed can be increased so that the speed is higher than that in any other embodiment.

The CMOS image sensors according to the above-described embodiments of the present embodiment, which are used as image pickup elements, can be applied as image pickup devices such as digital cameras or video cameras. Hereinafter, application of the CMOS image sensor 1 as an image pickup device will be described.

Figure 15:
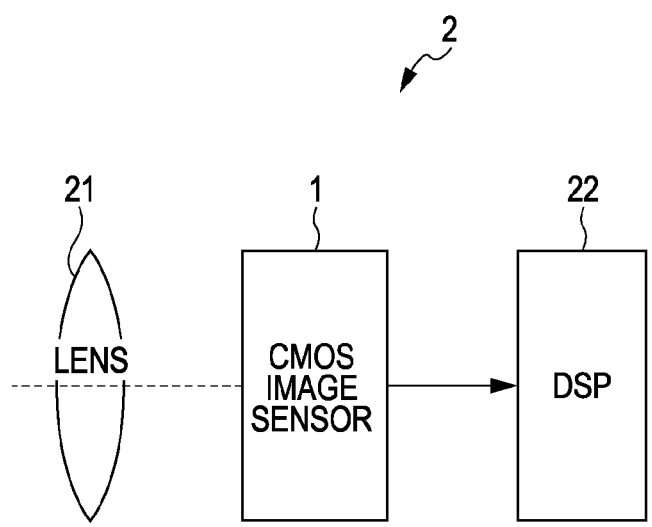
FIG. 15 is a diagram showing an example of a configuration of a camera in which the CMOS image sensor according to one of the embodiments of the present invention is applied.

FIG. 15 is a diagram showing an example of a configuration of a camera in which the CMOS image sensor according to one of the embodiments of the present invention is applied.

As shown in FIG. 15, a camera 2 includes the CMOS image sensor 1, an optical system, which leads incident light onto the pixel regions (the pixel unit 10) of the CMOS image sensor 1 (which forms an image of an object), and an image processing circuit 22, which processes output data SOUT that is output from the CMOS image sensor 1. The optical system is configured, for example, using a lens 21 that forms an image on an image pickup face with incident light (image light).

The image processing circuit 22 performs image processing, such as color interpolation, γ correction, an RGB conversion process, or a YUV conversion process, on the output data SOUT that is output from the CMOS image sensor 1.

Image signals that have been processed by the image processing circuit 22 are recorded on a recording medium such as a memory. A hard copy of image information that is recorded on the recording medium is produced using a printer or the like. The image signals that have been processed by the image processing circuit 22 are displayed as a moving picture on a monitor that is configured using a liquid-crystal display or the like.

Also in the above-described camera 2, not only the focal plane phenomenon, which is caused by shifts between the pixel readout times for the individual columns or shifts between the charge accumulation times, can be reduced, but also the speed at which reading out of the pixels is performed can be increased.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup integrated circuit, comprising:
a plurality of read signal lines;
a pixel unit having a plurality of pixel circuits having all pixels in the plurality of pixel circuits arranged in sequential rows and sequential columns in a matrix, the pixel unit being divided into a first pixel region having a first plurality of pixels from the plurality of pixel circuits and a second pixel region having a second plurality of pixels from the plurality of pixel circuits, the first pixel region comprising a first plurality of first pixel circuits in the sequential rows of the matrix, the second pixel region comprising a second plurality of second pixel circuits in the sequential rows of the matrix, wherein the pixels in the first plurality of pixels are directly adjacent to one another in the column direction with no intervening pixels from the second plurality of pixels, wherein the pixels in the second plurality of pixels are directly adjacent to one another in the column direction with no intervening pixels from the first plurality of pixels, wherein the first pixel region does not overlap with the second pixel region and the first pixel region does not contain pixel circuits from the second set of pixel circuits;
a first processing unit configured to process read signals only from the first pixel region;
a second processing unit configured to process read signals only from the second pixel region; and
a selection drive unit configured to select and drive each of the plurality of pixel circuits
wherein all of the pixels in the first plurality of pixels send read signals to only the first processing unit and all of the pixels in the second plurality of pixels send read signals to only the second processing unit such that all pixels in each row of the sequential rows go only to one of the first or the second processing circuits;
wherein the image pickup integrated circuit is a CMOS circuit; and
wherein the selection drive unit sequentially drives the plurality of pixel circuits in the first pixel region in units of rows in a direction from a last row of the first pixel region to a first row of the first pixel region, and sequentially drives the plurality of pixel circuits in the second pixel region in units of rows in a direction from a last row of the second pixel region to a first row of the second pixel region, the first row of the first pixel region being furthest from the last row of the second pixel region and the last row of the first pixel region being adjacent to the first row of the second pixel region.

2. The image pickup integrated circuit of claim 1, further comprising a camera that includes the image pickup integrated circuit of claim 1.

3. The image pickup integrated circuit of claim 1, wherein the first pixel region has no more than four sides and the second pixel region has no more than four sides.

4. The image pickup integrated circuit of claim 3, wherein one side of the first pixel region is in direct and contiguous contact with one side of the second pixel region.

5. The image pickup integrated circuit of claim 4, wherein every pixel in the first pixel region has four sides and every pixel in the first pixel region has no more than one side adjacent to any of the pixels in the second pixel region.

6. The image pickup integrated circuit of claim 5, wherein every pixel in the second pixel region has four sides and every pixel in the second pixel region has no more than one side adjacent to any of the pixels in the first pixel region.

7. The image pickup integrated circuit of claim 1, wherein every pixel in the first pixel region has four sides and every pixel in the first pixel region has no more than one side adjacent to any of the pixels in the second pixel region.

8. The image pickup integrated circuit of claim 1, further comprising a row drive circuit that simultaneously drives the first plurality of pixels and the second plurality of pixels.

9. The image pickup integrated circuit of claim 1, further comprising switches corresponding to each column in the first plurality of pixels and the second plurality of pixels, wherein the switches are driven by a column selection signal and the switches are sequentially turned on and off in units of columns in synchronization with the column selection signal.

10. The image pickup integrated circuit of claim 1, wherein the pixels are driven such that voltage signals are sequentially input from the first plurality of pixels and the second plurality of pixels to a control unit.

11. The image pickup integrated circuit of claim 10, further comprising a correction unit that corrects shifts of a gain or an offset voltage in the voltage signals.

12. The image pickup integrated circuit of claim 1, further comprising vertical signal lines that output the read signals from the first and the second plurality of pixels to the first and the second processing units, wherein the image pickup integrated circuit contains a number of selection transistors corresponding to the plurality of pixel circuits such that a number of selection transistors for each vertical signal line is less than a number of selection transistors for a circuit having only a single processing unit.

13. The image pickup integrated circuit of claim 1, further comprising at least two vertical signal lines corresponding to each column of the matrix.

14. The image pickup integrated circuit of claim 1, further comprising at least three vertical signal lines corresponding to each column of the matrix.

15. A method for controlling an image pickup integrated circuit, comprising:
outputting, by a plurality of pixel circuits that are divided into groups, read signals to read signal lines that are connected to a plurality of pixel circuits, the plurality of pixel circuits having all pixels in the plurality of pixel circuits arranged in sequential rows and sequential columns in a matrix in a pixel unit, the pixel unit being divided into a first pixel region having a first plurality of pixels from the plurality of pixel circuits and a second pixel region having a second plurality of pixels from the plurality of pixel circuits, the first pixel region comprising a first plurality of first pixel circuits in the sequential rows of the matrix, the second pixel region comprising a second plurality of second pixel circuits in the sequential rows of the matrix, wherein the pixels in the first plurality of pixels are directly adjacent to one another in the column direction with no intervening pixels from the second plurality of pixels, wherein the pixels in the second plurality of pixels are directly adjacent to one another in the column direction with no intervening pixels from the first plurality of pixels, wherein the first pixel region does not overlap with the second pixel region and the first pixel region does not contain pixel circuits from the second set of pixel circuits;

processing, by a first processing unit, the read signals only from the first pixel region;

processing, by a second processing unit, the read signals only from the second pixel region; and selecting and driving each of the plurality of pixel circuits by a selection drive unit;

wherein all of the pixels in the first plurality of pixels send read signals to only a first processing unit and all of the pixels in the second plurality of pixels send read signals to only a second processing unit such that all pixels in each row of the sequential rows go only to one of the first or the second processing circuits;

wherein the image pickup integrated circuit is a CMOS circuit; and wherein the selection drive unit sequentially drives the plurality of pixel circuits in the first pixel region in units of rows in a direction from a last row of the first pixel region to a first row of the first pixel region, and sequentially drives the plurality of pixel circuits in the second pixel region in units of rows in a direction from a last row of the second pixel region to a first row of the second pixel region, the first row of the first pixel region being furthest from the last row of the second pixel region and the last row of the first pixel region being adjacent to the first row of the second pixel region.

16. The method of claim 15, further comprising a camera that includes the image pickup integrated circuit of claim 15.

17. An image pickup integrated circuit, comprising:

a plurality of read signal lines;

a pixel unit having a plurality of pixel circuits having all pixels in the plurality of pixel circuits arranged in sequential rows and sequential columns in a matrix, the pixel unit being divided into a first pixel region having a first plurality of pixels from the plurality of pixel circuits and a second pixel region having a second plurality of pixels from the plurality of pixel circuits, the first pixel region comprising a first plurality of first pixel circuits in the sequential rows of the matrix, the second pixel region comprising a second plurality of second pixel circuits in the sequential rows of the matrix, wherein the pixels in the first plurality of pixels are directly adjacent to one another in the column direction with no intervening pixels from the second plurality of pixels, wherein the pixels in the second plurality of pixels are directly adjacent to one another in the column direction with no intervening pixels from the first plurality of pixels, wherein the first pixel region does not overlap with the second pixel region and the first pixel region does not contain pixel circuits from the second set of pixel circuits;

a first processing unit configured to process read signals only from the first pixel region;

a second processing unit configured to process read signals only from the second pixel region; and a selection drive unit configured to select and drive each of the plurality of pixel circuits;

wherein all of the pixels in the first plurality of pixels send read signals to only the first processing unit and all of the pixels in the second plurality of pixels send read signals to only the second processing unit such that all pixels in each row of the sequential rows go only to one of the first or the second processing circuits;

wherein the image pickup integrated circuit is a CMOS circuit; and wherein the selection drive unit sequentially drives the plurality of pixel circuits in the first pixel region in units of rows in a direction from a first row of the first pixel region to a last row of the first pixel region, and sequentially drives the plurality of pixel circuits in the second pixel region in units of rows in a direction from a last row of the second pixel to a first row of the second pixel region, the first row of the first pixel region being furthest from the last row of the second pixel region and the last row of the first pixel region being adjacent to the first row of the second pixel region.

18. The image pickup integrated circuit of claim 17, further comprising a camera that includes the image pickup integrated circuit of claim 17.

* * * * *